(12) United States Patent
Silva et al.

(10) Patent No.: US 8,417,511 B2
(45) Date of Patent: Apr. 9, 2013

(54) DYNAMIC GRAMMARS FOR REUSABLE DIALOGUE COMPONENTS

(75) Inventors: Aimee Silva, Miramar, FL (US); Baiju D. Mandalia, Boca Raton, FL (US); Victor S. Moore, Lake City, FL (US)

(73) Assignee: Nuance Communications, Burlington, MA (US)

( * ) Notice: Subject to any disclaimer, the term of this patent is extended or adjusted under 35 U.S.C. 154(b) by 1272 days.

(21) Appl. No.: 11/616,998

(22) Filed: Dec. 28, 2006

(65) Prior Publication Data
US 2008/0162140 A1    Jul. 3, 2008

(51) Int. Cl.
*G06F 17/27* (2006.01)
*G10L 21/00* (2006.01)

(52) U.S. Cl. .......................... 704/9; 704/231; 704/270.1

(58) Field of Classification Search ............... 704/9, 231, 704/270.1
See application file for complete search history.

(56) References Cited

U.S. PATENT DOCUMENTS

| | | | |
|---|---|---|---|
| 2002/0198719 A1* | 12/2002 | Gergic et al. | 704/270.1 |
| 2004/0010412 A1* | 1/2004 | Chiu | 704/270.1 |
| 2004/0133536 A1* | 7/2004 | Uceda-Sosa | 707/1 |
| 2004/0267518 A1* | 12/2004 | Kashima et al. | 704/9 |
| 2005/0043953 A1 | 2/2005 | Winterkamp et al. | |
| 2006/0047516 A1* | 3/2006 | Gaichies et al. | 704/270.1 |
| 2006/0069547 A1* | 3/2006 | Wang et al. | 704/10 |
| 2006/0241946 A1* | 10/2006 | Oerder | 704/270.1 |
| 2007/0240133 A1* | 10/2007 | Neil et al. | 717/140 |
| 2007/0288241 A1* | 12/2007 | Cross et al. | 704/270.1 |
| 2007/0294084 A1* | 12/2007 | Cross et al. | 704/251 |
| 2008/0065386 A1* | 3/2008 | Cross et al. | 704/270 |
| 2008/0134020 A1* | 6/2008 | Adeeb | 715/239 |
| 2008/0140389 A1* | 6/2008 | Funakoshi et al. | 704/9 |

* cited by examiner

*Primary Examiner* — Douglas Godbold
(74) *Attorney, Agent, or Firm* — Wolf, Greenfield & Sacks, P.C.

(57) ABSTRACT

A system and method for authoring a voice application is provided. The voice recognition process uses a dynamic grammar which obtains data from a backend data source based upon an input in order to create expected results that a speech engine can recognize. The process can retrieve data from at least one of a plurality of back-end data sources and can build a grammar based on the data using at least in part a dynamic grammar builder. The grammar is loaded into the voice recognition application using at least in part the reusable dialog component. A data access service, XSLT processor, or other data accessing framework can be used to facilitate access and manipulation of data in heterogeneous environments.

23 Claims, 4 Drawing Sheets

DYNAMIC GRAMMARS FOR REUSABLE DIALOGUE COMPONENTS

FIELD OF THE INVENTION

This invention relates to voice recognition, and particularly to generating dynamic grammars for reusable dialogue components of voice applications.

BACKGROUND OF THE INVENTION

The development of voice applications can be extremely complex. The complexity is typically exacerbated by the lack of availability of a dedicated, standard or well-known development architecture. Although more recent voice application development has adopted portions of the Web programming model, there are still significant differences between voice and Web applications.

To create robust voice applications, it generally has been necessary for voice application developers to be familiar with many programming languages, techniques, architectures, and processes. Compounding this problem, voice applications are often built using proprietary markup languages. The emergence of the standard for VoiceXML has eliminated some of this complexity, allowing voice developers to better focus their skills. VoiceXML allows adoption of Web programming models for voice applications, and implementation through use of a server-side framework, similar to implementation to Web applications.

However, speech recognition still tends to be more error-prone than collecting data in a Web application, since background noise and other factors can interfere with the recognition. Unlike Web applications, voice applications require dialogs between the computer and user such as to confirm an input or re-prompt a user, when there has been no input. Voice applications rely on grammars to know what words or phrases are to be recognized.

Reusable Dialog Components (RDC's), such as those that can be implemented as JSP 2.0 tags, are known. RDC's can assist in developing voice applications in the same manner as in Web applications. RDC's include the voice-specific elements, such as the dialog, grammars, and call flow, needed to obtain units of information. The developer using the RDC does not need to know the grammar included, but rather only needs to understand the attributes that the RDC tag requires. Use of RDC's to handle the interactions for common dialogs can free a developer to deal with more complicated areas of the voice application.

However, the contemporary RDC framework has a limited ability to accept static grammars. In order to have voice applications that include dynamic grammars, a developer implements a solution specific to their environment and the data source being used. Custom code is necessary, which would defeat the purpose of having reusable components. This is especially cumbersome when options and data given to a caller needs to be gathered dynamically from a backend source.

A need therefore exists for a technique implemented in voice recognition systems wherein the above-mentioned disadvantages can be mitigated or alleviated. A further need exists for a system or process that provides for dynamic grammars for reusable dialogue components.

SUMMARY OF THE INVENTION

A voice recognition system is provided in the exemplary embodiments that uses a dynamic grammar which obtains data from a backend data source based upon an input in order to create expected results that a speech engine can recognize.

In one exemplary embodiment of the present invention, there is provided a method for authoring a voice application. The method can include retrieving data from at least one of a plurality of back-end data sources based at least in part on an input; building a grammar based on the data using at least in part a dynamic grammar builder; and loading the grammar into the voice application using at least in part a reusable dialog component.

Another embodiment is a voice recognition system for generating a dynamic grammar for a reusable dialog component. The system can include a processor capable of retrieving data from at least one of a plurality of back-end data sources based at least in part on an input to the processor. The processor can be configured to build the dynamic grammar based on the data and to load the dynamic grammar into a voice application using at least in part the reusable dialog component.

Yet another embodiment is a computer-readable program embodied in an article of manufacture comprising computer readable program instructions for authoring a voice application. The program can include program instructions for causing the computer to retrieve data from at least one of a plurality of back-end data sources based at least in part on an input; program instructions for causing the computer to build a grammar based on the data using at least in part a dynamic grammar builder; and program instructions for causing the computer to load the grammar into the voice application using at least in part a reusable dialog component.

BRIEF DESCRIPTION OF THE DRAWINGS

Exemplary embodiments of the voice recognition system and process will now be described, by way of example only, with reference to the accompanying drawings, in which.

DETAILED DESCRIPTION

Exemplary embodiments described herein address the shortcomings of prior voice recognition systems by providing a process for generating dynamic grammars which can obtain data from one or more backend data sources based upon an input in order to create expected results that a speech engine can recognize. Exemplary embodiments will be explained in connection with various possible voice recognition systems and processes. The detailed description is intended only to be exemplary. Exemplary embodiments are shown in FIGS. 1-4, but the present disclosure is not limited to the illustrated structure or application.

In an exemplary embodiment according to aspects of the invention, an addition to the Reusable Dialog Component (RDC) framework is provided that utilizes the Service Data Object (SDO) framework to allow the use of dynamic grammars with RDC's. The SDO framework can simplify and unify the handling of data by an application and in particular a voice application. Using the SDO framework, uniform access and manipulation of data from multiple data sources including heterogeneous data sources, can be achieved for voice applications. Such access and manipulation can be achieved with various data sources including relational databases, XML data sources, Web services, and enterprise information systems. While this exemplary embodiment utilizes the SDO framework for accessing and manipulating data to generate dynamic grammars for the RDC, the present disclosure contemplates the use of other data handling frameworks that allow for access and manipulation of data from data sources in a heterogeneous environment.

In this exemplary embodiment, a Dynamic Grammar RDC (DGRDC) tag is added to the RDC framework which allows for the creation of RDC's that interact with one or more backend data sources through use of the SDO framework. This simplifies the development of complex voice applications that need to communicate with backend data sources to generate dynamic grammars. This allows for the reuse of the components and obviates the need to write custom code for voice applications accessing such data. RDC's are available in atomic or uncombined (i.e., single information input from the user) and composite (i.e., multiple information input from the user) formats. The present disclosure contemplates the use of either or both atomic and composite RDC's.

Figure 1:
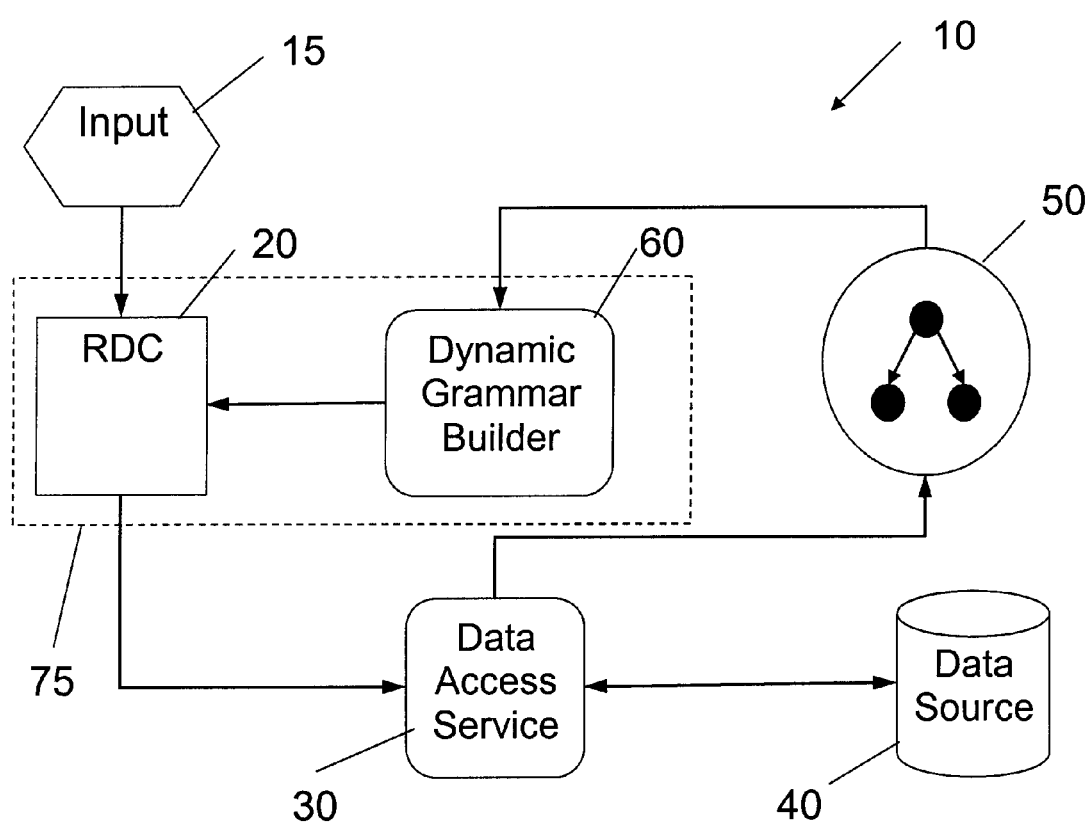
FIG. 1 is a schematic representation of a voice recognition system and process according to an exemplary embodiment of the invention.

Referring to FIG. 1, an exemplary embodiment of a voice recognition process is shown and generally represented by reference numeral 10. Process 10 uses a RDC 20 that interacts with a Data Access Service (DAS) 30 and a dynamic grammar builder 60. The DAS 30 is in communication with one or more data sources 40 and has the capability of creating or producing a data graph 50 based upon data from the data source(s).

The DAS 30 is part of the SDO framework which provides for a unified framework for data application development. Through use of DAS 30, process 10 removes the requirement of a developer being familiar with various technology-specific Application Programming Interfaces (API's) in order to access and utilize the voice recognition data. DAS 30 can access data sources including relational databases, entity Enterprise JavaBeans™ components, XML pages, Web services, the Java Connector Architecture, JavaServer pages, and more. The SDO framework provides for the contribution of voice applications and these applications will all be consistent with the SDO model. The SDO framework also incorporates J2EE patterns and practices, thus facilitating incorporation of proven architecture and designs into voice applications.

Process 10 includes a voice application with the capability to obtain data from the data graph 50 via the DAS 30 that is specific to some back-end data source 40. Preferably, the voice application can examine and/or update the data contained in the data graph 50. The present disclosure also contemplates the voice application employing the DAS 30 to propagate an entire set of updates back to the original data source 40.

In process 10, the RDC 20 communicates input data 15, which is related to the information the RDC requires, to the DAS 30. The DAS 30 queries the data source 40 to obtain the particular data sought. The DAS 30 then produces or creates the data graph 50.

The data graph 50 provides a nonpersistent copy of data which allows a voice application to work with the data even when there is no connection to the original data source. The data in data graph 50 can be organized as a group of data objects and can be linked together as a graphical structure. The data graph 50 may also contain a schema that describes the structure of the data object type(s) contained in the data graph. The data graph 50 can also maintain a Change History or other tracking structure to track all modifications made to the data graph for monitoring of updates. The voice application can preferably define the schema at runtime, allowing dynamic access of data objects.

Data graph 50 is populated from data source 40 by DAS 30. Preferably, DAS 30 can propagate back to the originating data source any changes made to the in-memory data graph 50. For example, DAS 30 can access a single type of data source, for example, Java Database Connectivity resources or entity Enterprise Java Beans™. DAS 30 can be provided with a description of the data to be accessed. This data description can be a schema and/or a query over the associated data source. The process 10 can make a request to the DAS 30 to return the data graph 50. The DAS 30 reads the requested data from the data source 40, constructs the data graph 50 of related data objects, and returns the data graph to the application. The process 10 makes changes to the data graph 50 in-memory and then sends the modified data graph back to the DAS 30. The DAS 30 examines a change summary contained in the data graph 50 and propagates the changes back to the original data source 40.

Use of the data graph 50 can be advantageous for applying multiple updates in one function or method call to reduce the number of connections and/or database operations. By storing data from multiple database rows and tables in the data graph 50, applications can make changes to the data without making additional round-trips to the database.

Since the data graph 50 is disconnected from the data source 40, potential updating conflicts may occur. For example, it is possible that another application may update the data in the data source that was used to populate the data graph before process 10 requests the DAS 30 to propagate the application's changes back to the data source. To handle such potential update conflicts, the DAS 30 can use an optimistic concurrency control and throw an exception to the application when a data collision occurs. The application can then re-read the data and re-start the transaction. The present disclosure contemplates recovering from a data collision by other methods as well.

The dynamic grammar builder 60 can retrieve data objects from the data graph 50 and build the dynamic grammar therefrom. The RDC 20 then loads the dynamic grammar. The RDC 20 can continue to interact with the user and collect more data using the dynamic grammar to match the new input.

The use of the dynamic grammar builder 60 coupled with the RDC 20 creates the dynamic grammar RDC 75. The DGRDC 75 provides a mechanism to create a configurable RDC where the configuration is specific to creating dynamic grammars. In addition to the default attributes of RDC's, the DGRDC 75 of the exemplary embodiment can have attributes to specify the DAS 30 along with the input type to be expected. The DAS 30 will interact with a plurality of back-end data sources as described above to produce data graphs representing the data. The DGRDC 75 can also have a grammar attribute to set the dynamic grammar, if the default dynamic grammar class is extended.

The dynamic grammar builder 60 can be added to the RDC framework to interact with the RDC 20. The optional grammar attribute of the DGRDC 75 should be of this type in the SDO framework. The grammar builder class can use the SDO framework to access the data objects from the data graph provided by the DAS 30. By default, the dynamic grammar builder 60 can build a grammar containing the list of expected results based on the data objects received from the data graph provided by the DAS.

The developer implementing the DGRDC 75 can provide the DAS 30 that communicates to the back-end data source 40 and creates the data graph 50. Various tools can be utilized for providing the DAS, such as, for example, Rational® Application Developer (RAD). The developer will also have the option of extending the default grammar builder class and setting an optional grammar attribute with their own.

An example of generating a SDO based service pattern can include defining one or more SDO's for a container-managed persistent entity bean and generating a session facade bean that includes methods for operating on one or more data object graphs. A client of the service pattern may define the session facade bean definitions, SDO definitions, and query definitions for service data objects.

Process 10 can also be used for updating of the back-end data source 40 via input to the RDC 20. Any changes made to the data graph 50 could be input into the RDC 20 and passed to the DAS 30 for updating of the data source 40. An additional attribute and class could be used to hold the logic, such as, for example, business logic, for any updates made to the data source(s) 40.

Figure 2:
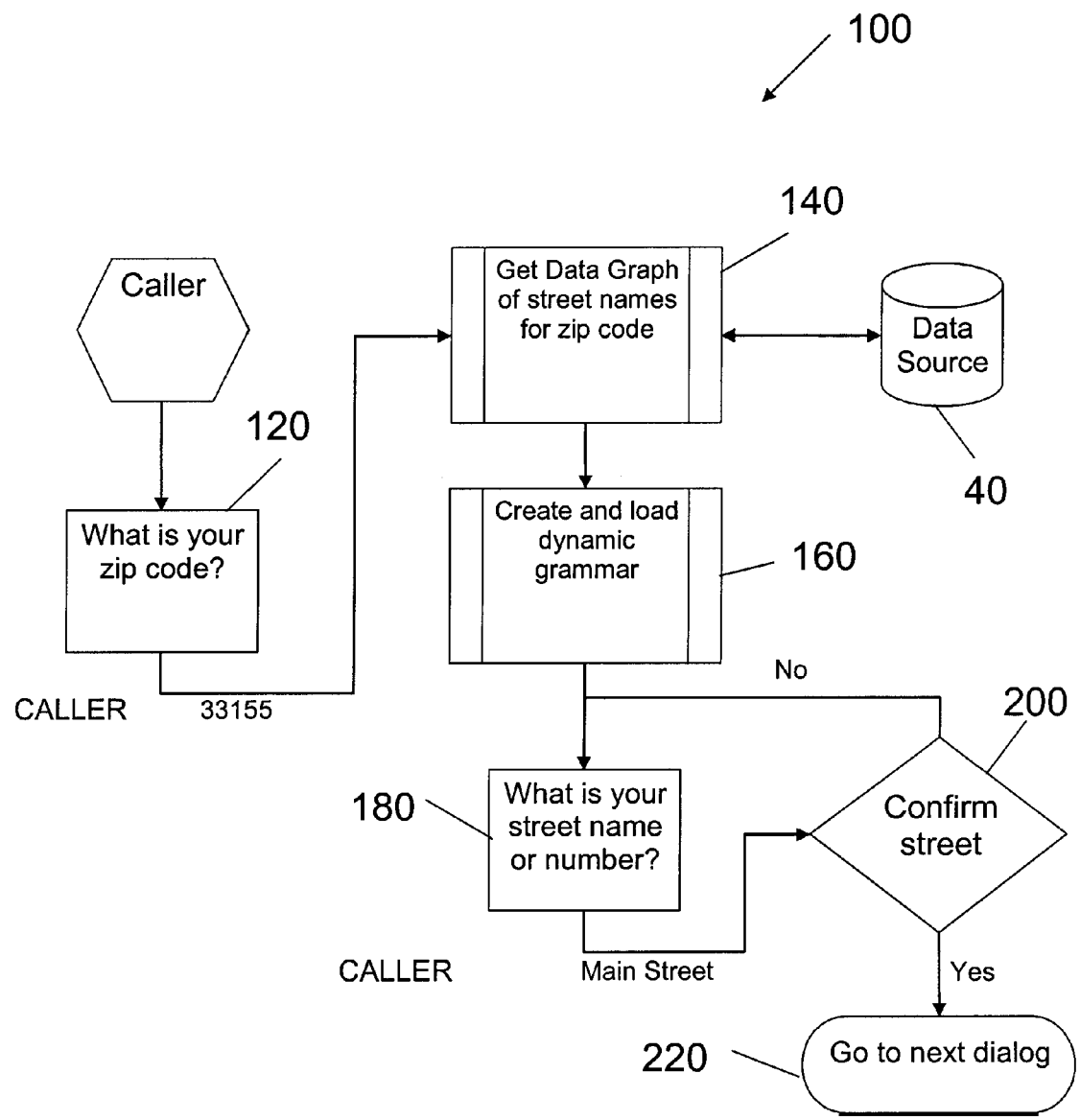
FIG. 2 is a flow chart illustrating interaction of the voice recognition system and process of FIG. 1 with a caller.

Referring to FIG. 2, a process 100 is shown for the DGRDC 75 interacting with a caller and the DAS 30. The RDC 20 prompts the caller for a zip code in step 120. In step 140, the RDC 20 collects the zip code and passes it to the DAS 30, which then gets the street name information from the data source 40 and produces the data graph 50. The particular data structure of the zip code data in data source 40 is accessible via the SDO framework and, in particular, the use of DAS 30. Step 140 eliminates the need for a developer to customize code based upon the particular data structure, zip code data, being accessed.

In step 160, the dynamic grammar builder 60 then creates a dynamic grammar with the street address and the RDC 20 loads the newly created dynamic grammar. The RDC 20 then prompts the caller for the street name or number in step 180. The caller speaks his street name or number and the RDC 20 passes the street name or number to the recognition engine, which will use the dynamic grammar to match the caller's input.

Once the match is made, the recognition engine confirms the street name or number in step 200 and continues to the next dialog in step 220. If the caller does not confirm the street name or number, the caller can be re-prompted for the address.

Figure 3:
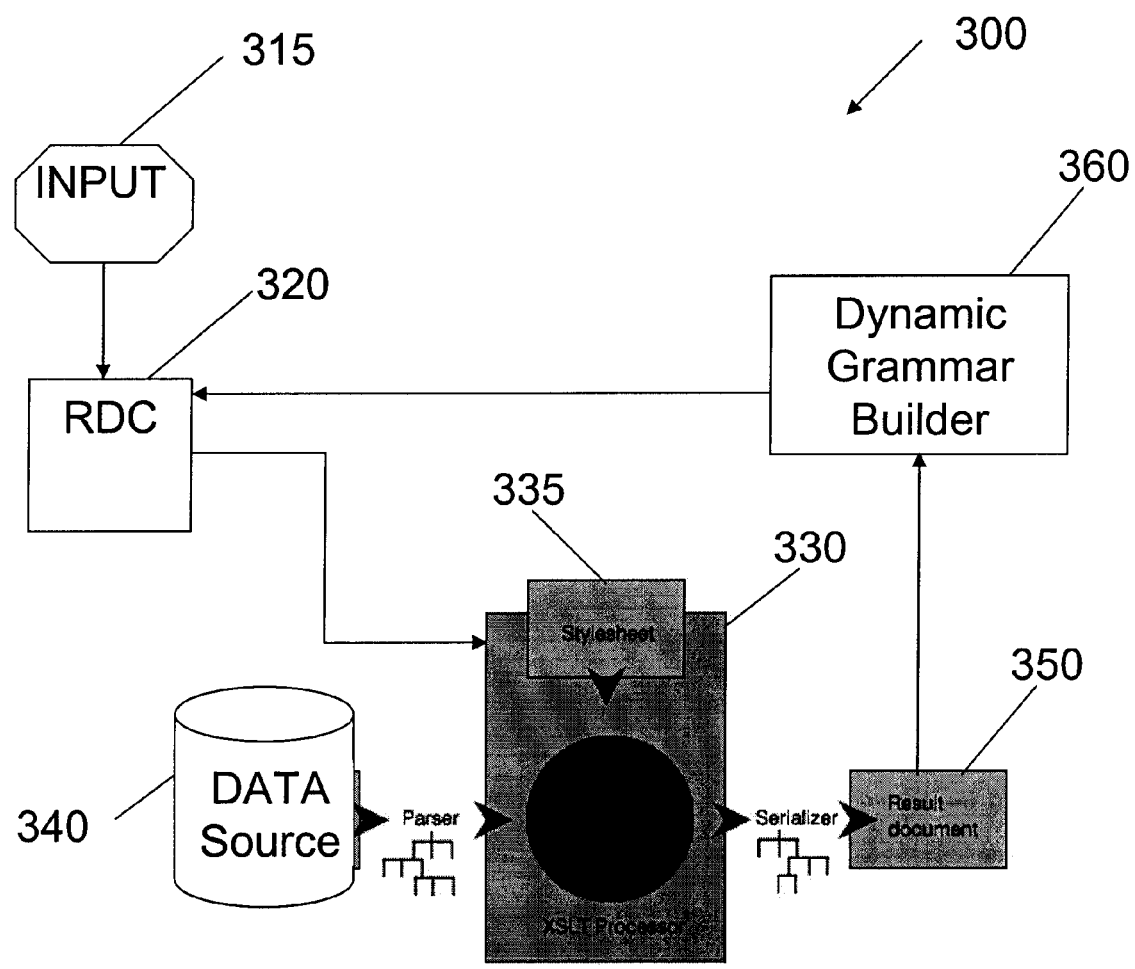
FIG. 3 is a schematic representation of a voice recognition system and process according to another exemplary embodiment of the invention.

In another exemplary embodiment shown in FIG. 3, a voice recognition process is shown and generally represented by reference numeral 300. Process 300 uses a RDC 320 that interacts with a XSL transformer (XSLT) processor 330 and a dynamic grammar builder 360. The XSLT processor 330 is in communication with one or more data sources 340 and has the capability of producing or creating a data graph 350. The XSLT processor 330 accepts data structures, such as a tree structure, as its input from the data source 340 and generates another data structure, such as a tree structure, as an output.

In process 300, the RDC 320 passes input data 315, which is related to the information the RDC requires, to the XSLT processor 330. The XSLT processor 330 then retrieves data from the data source 340 and generates data graph 350 based upon the stylesheet 335. The stylesheet 335 comprises templates or functions that can define a fragment of the output data structure or tree as a function of the input data structure or tree.

The dynamic grammar builder 360 then builds the dynamic grammar based on data graph 350. The RDC 320 then loads the dynamic grammar. The RDC 320 can continue to interact with the user and collect more data using the dynamic grammar to match the new input. The XSLT processor 330 can be particularly effective in working with XML data sources.

Figure 4:
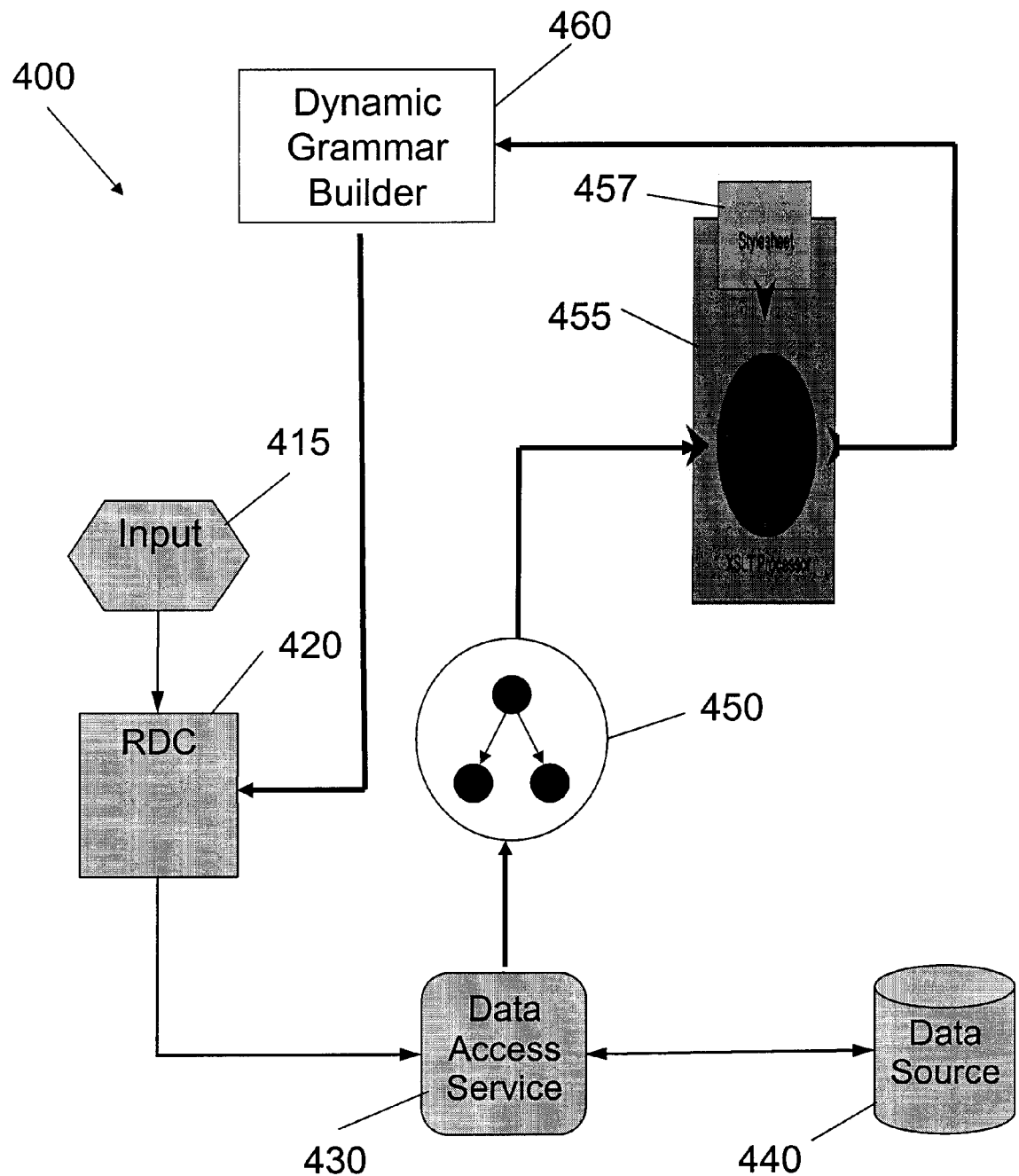
FIG. 4 is a schematic representation of a voice recognition system and process according to another exemplary embodiment of the invention.

In another exemplary embodiment shown in FIG. 4, a voice recognition process is shown and generally represented by reference numeral 400. Process 400 uses a RDC 420 that interacts with a DAS 430, a XSLT processor 455 and a dynamic grammar builder 460.

In process 400, the RDC 420 passes input data 415, which is related to the information the RDC requires, to the DAS 430. The DAS 430 queries the data source 440 to obtain the data sought. The DAS 430 then produces or creates the data graph 450. The data graph 450 can be serialized to an XML format.

The XSLT processor 455 can transform the serialized XML data from data graph 450 to a Speech Recognition Grammar Specification (SRGS) XML grammar based upon the stylesheet 455. The dynamic grammar builder 460 then retrieves the SRGS XML grammar and the dynamic grammar is loaded. The RDC 420 can continue to interact with the user and collect more data using the dynamic grammar to match the new input.

The exemplary embodiments provide a process for the creation and use of dynamic grammars. This allows for configuration of RDC's specific to voice applications. Existing Service Data Objects can be mapped to a grammar for this dynamic process to provide for consumption by the reusable dialog. The exemplary embodiments obviate the need for development of custom code specific to a system by using the SDO, XSLT or other data access frameworks that can universally access heterogeneous back-end data sources and collect the data therefrom to dynamically generate the grammars.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:
1. A method, comprising:
    issuing a first command, via a reusable dialog component, to a data access service to retrieve data from at least one back-end data source, the format of the first command being independent of the at least one back-end data source;

retrieving the data, via the data access service, from the at least one back-end data source by using a second command that is selected based, at least in part, on the first command and the at least one back-end data source;

storing the data, via the data access service, in a data structure in a data structure format that is independent of the at least one back-end data source;

building a grammar based on the data structure using, at least in part, a dynamic grammar builder; and loading the grammar into a first voice application in a manner enabling its use by the reusable dialog component, the reusable dialog component defining an interaction sequence between the first voice application and a user of the first voice application, the reusable dialog component being adapted for use in at least one voice application other than the first voice application.

2. The method of claim 1, wherein storing the data in the data structure comprises the data access service populating a data graph based on the data.

3. The method of claim 2, wherein the dynamic grammar builder accesses data objects of the data graph to build the grammar.

4. The method of claim 3, further comprising:
serializing the data graph to XML formatted data; and
transforming the XML formatted data to a Speech Recognition Grammar Specification XML grammar.

5. The method of claim 2, further comprising updating the at least one back-end data source based on the first command.

6. The method of claim 5, further comprising generating an attribute and a class representative of logic for the updating of the at least one back-end data source.

7. The method of claim 1, wherein the at least one back-end data source stores the data in XML format.

8. The method of claim 1, further comprising:
issuing the first command, via the reusable dialog component, to the data access service to retrieve data from a second back-end data source different than the at least one back-end data source, the format of the first command being independent of the second back-end data source;
retrieving the second data, via the data access service, from the second back-end data source by using a third command that is selected based, at least in part, on the first command and the second back-end data source; and
storing the second data, via the data access service, in a second data structure in the data structure format, wherein the data structure format is independent of the second back-end data source.

9. A system, comprising:
at least one processor; and
at least one storage medium storing instructions which, when executed by the at least one processor, perform acts of:
issuing a first command, via a reusable dialog component, to a data access service to retrieve data from at least one back-end data source, the format of the first command being independent of the at least one back-end data source;
retrieving the data, via the data access service, from the at least one back-end data source by using a second command that is selected based, at least in part, on the first command and the at least one back-end data source;
storing the data, via the data access service, in a data structure in a data structure format that is independent of the at least one back-end data source;

building a grammar based on the data structure using, at least in part, a dynamic grammar builder; and
loading the grammar into a first voice application in a manner enabling its use by the reusable dialog component, the reusable dialog component defining an interaction sequence between the first voice application and a user of the first voice application, the reusable dialog component being adapted for use in at least one voice application other than the first voice application.

10. The system of claim 9, wherein storing the data in the data structure comprises the data access service populating a data graph based on the data.

11. The system of claim 10, wherein the instructions define accessing data objects of the data graph to build the grammar.

12. The system of claim 11, wherein the instructions define serializing the data graph to XML formatted data and transforming the XML formatted data to a Speech Recognition Grammar Specification XML grammar.

13. The system of claim 10, wherein the instructions define updating the at least one back-end data source based on the first command.

14. The system of claim 13, wherein the instructions define generating an attribute and a class representative of logic for the updating of the at least one back-end data source.

15. The system of claim 9, wherein the at least one storage medium storing instructions which, when executed by the at least one processor, further perform acts of:
issuing the first command, via the reusable dialog component, to the data access service to retrieve second data from a second back-end data source different than the at least one back-end data source, the format of the first command being independent of the second back-end data source;
retrieving the second data, via the data access service, from the second back-end data source by using a third command that is selected based, at least in part, on the first command and the second back-end data source; and
storing the second data, via the data access service, in a second data structure in the data structure format, wherein the data structure format is independent of the second back-end data source.

16. An article of manufacture having stored thereon computer readable program instructions which, when executed, perform a method comprising:
causing a computer to issue a first command, via a reusable dialog component, to a data access service to retrieve data from at least one back-end data source, the format of the first command being independent of the at least one back-end data source;
causing the computer to retrieve the data, via the data access service, from the at least one back-end data source by using a second command that is selected based, at least in part, on the first command and the at least one back-end data source;
causing the computer to store the data, via the data access service, in a data structure in a data structure format that is independent of the at least one back-end data source;
causing the computer to build a grammar based on the data structure using, at least in part, a dynamic grammar builder; and
causing the computer to load the grammar into a first voice application in a manner enabling its use by the reusable dialog component, the reusable dialog component defining an interaction sequence between the first voice application and a user of the first voice application, the reusable dialog component being adapted for use at least one voice application other than the first voice application.

17. The article of manufacture of claim 16, wherein causing the computer to store the data in the data structure comprises causing the data access service to populate a data graph based on the data.

18. The article of manufacture of claim 17, further comprising program instructions for causing the dynamic grammar builder to access data objects of the data graph to build the grammar.

19. The article of manufacture of claim 18, further comprising:
program instructions for causing the computer to serialize the data graph to XML formatted data; and
program instructions for causing the computer to transform the XML formatted data to a Speech Recognition Grammar Specification XML grammar.

20. The article of manufacture of claim 17, further comprising program instructions for causing the computer to update the at least one back-end data source based on the first command.

21. The article of manufacture of claim 20, further comprising program instructions for causing the computer to generate an attribute and a class representative of logic for the update of the at least one back-end data source.

22. The article of manufacture of claim 16, wherein the at least one back-end data source stores the data in XML format.

23. The article of manufacture of claim 16, further comprising program instructions for:
causing a computer to issue the first command, via the reusable dialog component, to the data access service to retrieve second data from a second back-end data source different than the at least one back-end data source, the format of the first command being independent of the second back-end data source;
causing the computer to retrieve the second data, via data access service, from the second back-end data source by using a third command that is selected based, at least in part, on the first command and the second back-end data source; and
causing the computer to store, via the data access service, the second data in a second data structure in the data structure format, wherein the data structure format is independent of the second back-end data source.

* * * * *